Feb. 21, 1967   H. C. WELSER   3,304,631
EARTH MOVING IMPLEMENT
Filed May 25, 1964
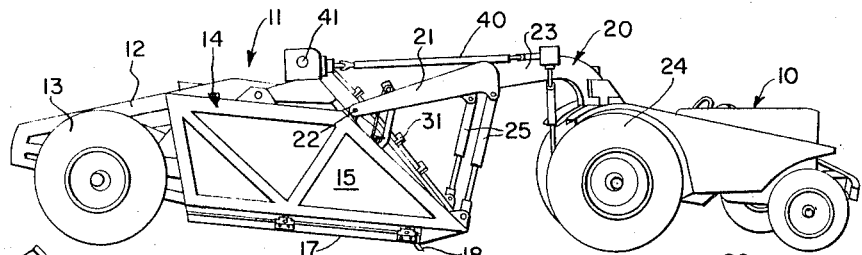
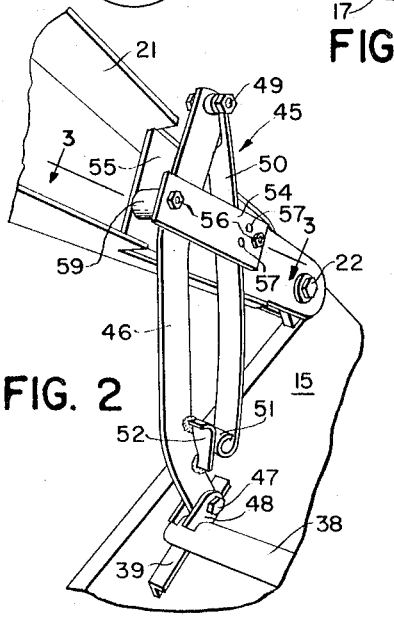
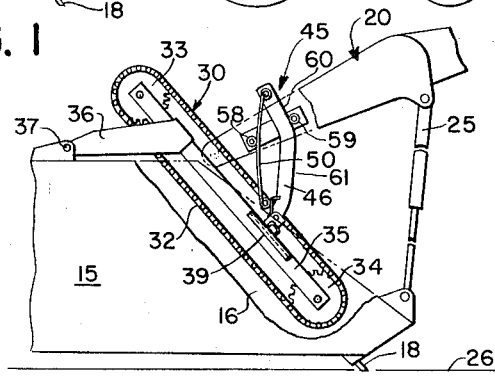
INVENTOR.
HAROLD C. WELSER
BY *William A. Murray*
ATTORNEY United States Patent Office 3,304,631
Patented Feb. 21, 1967

3,304,631
EARTH MOVING IMPLEMENT
Harold C. Welser, Rock Island, Ill., assignor to Deere &
Company, Moline, Ill., a corporation of Delaware
Filed May 25, 1964, Ser. No. 369,796
9 Claims. (Cl. 37—8)

This invention relates to a scraper carrier of the type including a material carrying bowl with side walls interconnected by a floor having a forwardly positioned cutting blade. Still more particularly this invention relates to an elevator used in combination with the scraper bowl that operates in conjunction with the material moving over the scraper blade to move the material both upwardly and rearwardly into the bowl. Still more particularly this invention relates to a detent latch device holding the elevator down and into engagement with the material, but releasable upon a large stone or other unbreakable object passing between the blade and elevator.

A scraper carrier of the type the present invention operates most advantageously with, is composed of a material carrying bowl supported at its rear end on wheels and at its forward end by a forwardly directed yoke structure composed of a centrally located fore-and-aft extending draft member and a pair of rearwardly directed side arms pivotally connected at their rear ends to the vertical side walls of the bowl. The blade on the floor of the bowl is raised and lowered, as well as the entire bowl, by extending or retracting a pair of hydraulic cylinders extending between the side arms and the bowl. As is conventional, the cutting blade and bowl may be raised to transport position in which the entire bowl is raised above the ground; a ground leveling position in which the cutting blade scrapes across the normal surface of the ground; and a material digging position in which the scraper blade penetrates beneath the surface of the ground for purposes of digging and moving material into the bowl.

The scraper is often used in combination with other material handling implements which move earth or material in long rows or mounds and in position to be picked up by the material scraper. The scraper is pulled at a relatively high rate of speed with the scraper blade substantially at ground level along the rows and operates to pick up the rows or mounds of dirt. It has been determined in operation of a scraper at high rates often the dirt or material will not have the opportunity to move into the bowl and consequently the entire scraper carrier will often operate to push or bulldoze the dirt to eventually cause it to move outwardly of the side walls of the scraper. This, of course, results in a very inefficient and undesirable pick-up operation. One of the methods of overcoming this problem is to hold the elevator in a down position so that the flights of the elevator will actually penetrate the earth as it moves over the blade and shovel it into the rear of the bowl. However, while it is desirable to hold the elevator in a fixed down position, it is also necessary to provide some type of release for the hold down mechanism which will permit the elevator to rise upon a large stone or unbreakable object passing between the flights and the scraper blade or floor of the bowl. Also, it is desirable when using a hold down device to be able to make it inoperative when the scraper is in an earth-digging position since it is extremely desirable when digging the earth to have a relatively free floating type of elevator.

With the above in mind, it is the primary purpose of the present invention to provide a new and novel latch mechanism extending between the side arms of the yoke structure and the elevator which will become particularly effective to hold down the elevator only under the conditions in which the carrier bowl is in a material leveling or pick-up position, i.e., in which the blade is closely adjacent the level of the ground.

Specifically it is the purpose of the invention to provide a latch mechanism having lost motion in regard to its hold down characteristic so that when the scraper bowl is in its digging position the elevator will be free to float without incurring the effect of the hold down mechanism.

More specifically it is the purpose of the present invention to provide on each side of the elevator a pair of vertically disposed elements mounted on the elevator and extending upwardly alongside the respective yoke arms. The vertical elements are normally biased against movement relative to one another. On each of the yoke arms there is provided a pair of members engaging the elements and, as the elevator rises, causing at least one of the members to force the elements against the pressure of the biasing means so that the elevator will be forced to overcome a relatively large force should it continue in its rising motion. The biasing force between the two elements will be of such a degree that the elevator may rise if a stone or large unbreakable object passes between the floor of the bowl and the elevator flighting, but will be sufficient to hold down the elevator against dirt moving over the blade.

Other objects and advantages of the present invention will become apparent to those skilled in the art as the nature of the invention is better understood from the following description and as shown in the accompanying drawings.

FIG. 1 is a side view of a scraper-carrier and tractor utilizing the structure of the present invention.

FIG. 2 is a front and side perspective view of the hold down or latch device extending between the elevator frame and the yoke arm and shows portions of the elevator, carrier bowl, and yoke arm.

FIG. 3 is a sectional view taken substantially along the line 3—3 of FIG. 2.

FIG. 4 is a side view, generally in representative form, of the forward end of the material carrying bowl, the elevator, the yoke structure, and one of the latch devices, and showing the bowl in a leveling position.

FIG. 5 is a view similar to FIG. 4, but showing the latch in a released position.

FIG. 6 is a view somewhat similar to FIG. 4, but showing the scraper bowl in a digging position.

The scraper carrier is composed of two parts, the first being a main mobile vehicle which in the particular instance is a tractor 10, and the second being a rear bowl structure 11 supported at its rear end by a wheel assembly 13 including structural members 12 extending forwardly and connected to a forwardly disposed material carrying bowl 14. The bowl 14 is composed of a pair of oppositely disposed upright side walls 15, 16 interconnected at their lower edges by a floor structure 17. The floor structure 17, as is conventional, is adapted for retraction so that material may be moved out of the forward end of the bowl. A transverse scraper blade 18 is provided adjacent the forward open side of the bowl and is adapted to move rearwardly with the floor 17.

A yoke structure 20 is composed of a pair of rear fore-and-aft extending side arms 21 pivotally connected at 22 to the respective side walls 15, 16 to move vertically relative thereto. A forwardly directed and centrally located draft member 23, gooseneck in shape, extends over the rear wheel assembly 24 of the tractor and is articulately connected thereto. The bowl structure 14 is therefore supported at its rear end by the wheel assembly 13 and at its forward end by the wheel assembly 24. Raising and lowering of the bowl 14 is affected by a pair of hydraulic cylinders 25 interconnecting the forward ends of the side arms 21 and the forward ends of the respective side walls 15, 16. The bowl 14 and particularly the front cutting edge 18 of the bowl may be moved in respect to the ground level, as indicated at 26, by extending or retracting the cylinders 25.

Disposed in the forward open end of the bowl 14 is an inclined elevator 30 having a lower end adjacent the cutting blade 18 and extending upwardly and rearwardly to an upper rear end disposed above the side walls 15, 16. The elevator is of a flight type having a series of transverse flight elements 31 extending across and interconnecting a pair of transversely spaced continuous flexible elements or chains 32 extending around upper and lower sprockets 33, 34 respectively. The exact construction of the elevator is shown and described in U.S. Patent 3,028,694. Also, the general construction of the bowl structure 14 is shown and described in more detail in U.S. Patent 3,048,933. A drive mechanism, indicated in its entirety by the reference numeral 40 extends from a power take-off shaft, not shown, on the tractor first upwardly and then rearwardly to a transverse drive shaft 41 that operates the upper sprockets 33 of the elevator. Details of the drive mechanism 40 are shown and described in U.S. Patent 3,038,266. Should more information be desired relative to these various features, reference may be had to these patents.

The elevator 30 has a main inclined frame 35 extending between the upper and lower sprockets 33, 34 and a rearwardly projecting arm structure 36 at its upper rear end pivotally mounted at 37 to the upper edges of the respective side walls 15, 16. The entire elevator is permitted vertical movement about the axis of the pivots 37 and the lower end of the elevator may therefore float over the material moving over the blade 18 and generally in accordance with the height of the material passing over the blade. The frame 35 further includes a transverse beam 38 having transverse opposite ends adjacent the respective side walls 15, 16. Extending inwardly from the walls 15, 16 and beneath the transverse beam 38 is a pair of abutment plates 39 positioned to limit downward movement of the elevator 30 to a minimum predetermined height above the floor 17 and blade 18. Latch mechanisms 45 extend between the elevator 30 and the bowl structure 14 and operates to hold the elevator in its down position occurring when the beam 38 is in engagement with the stops or plates 39. Each mechanism 45 is composed of a vertical rigid member 46 bolted for pivotal movement at 47 to brackets 48 projecting from each of the ends of the transverse beam 38. The upper end of the member 46 is pivotally linked at 49 to a leaf spring member 50. The leaf spring 50 has a lower rolled end 51 bearing against a wear plate 52 welded to a rear edge of the member 46. The leaf spring 50 arches fore and aft away from the rigid member 46.

Each arm 21 is provided on its inner surface with an upright plate 55, welded to the respective side arm or beam 21. Each plate carries by means of bolts 56 a pair of member engaging elements or rollers 58, 59 that engages the edge of the elongated member 46 and the flat surface of the spring 50 respectively. The member 46 and spring 50 are held against transverse movement in respect to the rollers by an inner plate 54 that retains them between the rollers 58, 59 and against supporting plate 55. Bolt openings 57 are provided in the plate 54 for purposes of adjusting the point of contact between the rolls 58, 59 and member 46.

The main rigid member 46 of the mechanism 45 has a forward edge composed of an upper inclined or ramp portion 60 and a lower vertically disposed portion 61. The forward edges of the portions 60, 61 are normally in engagement or close to engagement with the roller 59.

Before describing the full operation of the hold down or latch mechanism 45, it should be again emphasized that there is an interrelation of movement between the side arms 21 and the carrier bowl 14. For purposes of digging material from the ground, the hydraulic cylinders 25 are extended so that the blade 18 penetrates the ground and scoops as well as digs material into the area of the lower end of the elevator. When it is desired to merely collect material on the ground, the hydraulic cylinders 25 are adjusted so that the blade 18 is substantially at the level of or engages the level 26 of the ground. When collecting dirt on the surface of the ground and particularly in areas where the dirt is moved into mounds or windrows, it is desirable to move the scraper at the maximum rate of speed while at the same time doing an efficient job of picking up the dirt. From actual operation, it has been found desirable to maintain the elevator at substantially a level when it is in contact with the stops 39, and to force the flighting 31 on the elevator into the loose ground to thereby cause the flights to operate as shovels that throw the material into the bowl 14. However, when the scraper is digging material from beneath the ground level 26, it is desirable to maintain a relatively free moving or floating elevator 30 that will adjust to the height of the material moving over the blade 18.

With the above in mind, and now referring to FIGS. 4, 5 and 6, when the scraper is in digging position, as shown in FIG. 6, the side arms 21 are normally raised in respect to the scraper bowl 14 and consequently the rollers 58, 59 are moved upwardly in respect to the members 46, 50. Thus, when in digging position the ramp edge 60 of the member 46 as well as the member 50 will not operatively contact the rollers 58, 59.

When it is desired to move the blade 18 into ground engaging level 26, the cylinders 25 are retracted and the angular relation between the arms 21 and bowl 14 is reduced and the rollers 58, 59 are moved downwardly to the lower end of the ramp end 60. The elevator 30 will normally rest on its stops 39. Therefore, to create upward movement of the lower end 34 of the elevator 30, when the blade 18 is in ground level position, will require sufficient force to pass the ramp edge 60 completely under the roller 59. This, of course, is the maximum load that must be overcome by the elevator to move the roller 59 onto the vertical portion 61. In actual operation, and in the type of scraper shown, such load will require an additional 900 pounds to move from the position shown in FIG. 4 to the position shown in FIG. 5. Therefore, not only is the weight of the elevator provided to prevent upward movement thereof, but an additional load created by the spring loaded latch or detent mechanism 45 is also applied to the elevator 30 so as to prevent upward movement.

However, provision must be made to pass large unbreakable objects between the lower end of the elevator and the floor and blade 18. Therefore, should a sufficiently large unbreakable object pass between the lower end of the elevator 30 and the blade 18, it will effect raising of the elevator beyond the detent force created by the leaf spring 50, and the roller 59 will pass onto the edge of the vertical portion 61 precisely as shown in FIG. 5. Once the spring 50 is compressed sufficiently to pass the rollers 58, 59 into the lower portion of the members 46, 50, the force then required to move the elevator is negligible although there will be sufficient force resisting movement of the elevator to operate as a damper in either direction. However, for all practical purposes, the latch mechanism 45 is in operation only upon the bowl being positioned so that the blade 18 is in ground level position, and is released after the elevator moves upwardly a small amount. As previously mentioned when the blade is in its digging position, the entire latch mechanism is in inoperative position and there is a free motion relation between the rollers 58, 59 and the latch parts 46, 50.

While only one form of the invention has been shown, it should be recognized that other forms and variations will occur to those skilled in the art. Therefore, while the preferred form is shown for the purpose of clearly and concisely illustrating the principles of the invention, it should be understood that there is no intention to limit or narrow the invention beyond the broad concepts set forth in the appended claims.

What is claimed is:

1. In a scraper-carrier type implement having a mobile material carrying bowl with upright side walls and a floor structure, a forward transverse blade, a yoke draft structure including a pair of fore-and-aft extending arms pivotally connected at their rear ends to the side walls and rigidly interconnected at their forward ends, the yoke structure further having a forwardly directed drawbar adapted for connection at its forward end to a wheeled implement, and power means between the yoke structure and bowl for raising and lowering the bowl to adjust the blade in relation to the ground level, the combination therewith comprising: a flight type elevator structure disposed adjacent the forward end of tne bowl disposed to engage material passing over the blade, the elevator being inclined from a lower forward end adjacent the blade to an upper rear end and having opposite sides adjacent the side walls, means pivotally supporting opposite sides of the elevator on the side walls whereby the lower end of the elevator may float in accordance with the material passing over the blade; abutment means on the bowl limiting downward movement of the elevator to a predetermined height; a vertical latch device supported at its lower end on each of the elevator sides and extending upwardly alongside the respective arms of the yoke structure, each device being composed of vertically disposed elongated elements biased against movement in relation to one another, one of the elements having a ramp edge; a device engaging structure supported on each of the arms having spaced apart element-engaging members adapted to engage the respective elements for effecting movement of the elements contra the biasing action in response to upward movement of the elevator, the ramp edge being so located that when the blade is substantially at the ground level, maximum downward pressure is applied to the elevator to prevent upward movement of the elevator from the aforesaid predetermined height.

2. In a scraper-carrier type implement having a mobile material carrying bowl with upright side walls and a floor structure, a forward transverse blade, a yoke draft structure including a pair of fore-and-aft extending arms pivotally connected at their rear ends to the side walls and rigidly interconnected at their forward ends, the yoke structure further having a forwardly directed drawbar adapted for connection at its forward end to a wheeled implement, and power means between the yoke structure and bowl for raising and lowering the bowl to adjust the blade in relation to the ground level, the combination therewith comprising: a flight type elevator structure disposed adjacent the forward end of the bowl disposed to engage material passing over the blade, the elevator being inclined from a lower forward end adjacent the blade to an upper rear end and having opposite sides adjacent the side walls; means pivotally supporting opposite sides of the elevator on the side walls whereby the lower end of the elevator may float in accordance with the material passing over the blade; abutment means on the bowl limiting downward movement of the elevator to a predetermined height; a latch device supported on each of the elevator sides and adapted to extend adjacent the respective arms of the yoke structure; a device engaging means supported on each of the arms adapted to engage the respective latch device when the blade is substantially at the ground level to thereby resist upward movement of the elevator; said latch device being spring loaded to release upon sufficient upward force being applied by the elevator.

3. In a scraper-carrier type implement having a mobile material carrying bowl with upright side walls and a floor structure, a forward transverse blade, a yoke draft structure including a pair of fore-and-aft extending arms pivotally connected at their rear ends to the side walls and rigidly interconnected at their forward ends, the yoke structure further having a forwardly directed drawbar adapted for connection at its forward end to a wheeled implement, and power means between the yoke structure and bowl for raising and lowering the bowl to adjust the blade in relation to the ground level, the combination therewith comprising: a flight type elevator structure disposed adjacent the forward end of the bowl disposed to engage material passing over the blade, the elevator being inclined from a lower forward end adjacent the blade to an upper rear end and having opposite sides adjacent the side walls; means pivotally supporting opposite sides of the elevator on the side walls whereby the lower end of the elevator may float in accordance with the material passing over the blade; a pair of latch mechanisms extending between the elevator sides and the respective arms of the yoke structure adapted to engae when the blade is substantially at the ground level to thereby resist upward movement of the elevator and being adapted to release upon sufficient upward force being applied by the elevator.

4. In a scraper-carrier having a mobile material carrying bowl with upright side walls and a floor structure, a forward transverse blade on the bowl, a yoke structure including a pair of fore-and-aft extending arms pivotally connected at their rear ends to the side walls and rigidly interconnected at their forward ends, the yoke structure further having a forwardly directed drawbar adapted for connection at its forward end to a wheeled implement, and power means between the yoke structure and bowl for raising and lowering the bowl to vertically adjust the blade in relation to the ground level, the combination therewith comprising: a flight type elevator structure disposed adjacent the forward end of the bowl disposed to engage material passing over the blade, the elevator being inclined from a lower forward end adjacent the blade to an upper rear end and having opposite sides adjacent the side walls; means pivotally supporting opposite sides of the elevator on the side walls whereby the lower end of the elevator may float in accordance with the material passing over the blade; latch mechanism extending between the elevator and the yoke structure, the mechanism having a lost motion interconnection whereby it is ineffective when the bowl is lower than the position placing the blade substantially at ground level and becomes effective when the blade is substantially at the ground level to thereby resist upward movement of the elevator.

5. In a scraper-carrier having a material carrying bowl structure including a rear wheel assembly supporting the rear end of a bowl with upright side walls and a floor structure, a forward transverse blade on the bowl, a yoke including a pair of fore-and-aft extending arms pivotally connected at their rear ends to the side walls and rigidly interconnected at their forward ends, the yoke structure further having a forwardly directed drawbar adapted for connection at its forward end to a wheeled assembly, and power means between the yoke structure and bowl for raising and lowering the bowl to vertically adjust the blade in relation to the ground level, the combination therewith comprising: a flight type elevator structure disposed adjacent the forward end of the bowl disposed to engage material passing over the blade, the elevator being inclined from a lower forward end adjacent the blade to an upper rear end and having opposite sides adjacent the side walls; means pivotally supporting opposite sides of the elevator on the side walls whereby the lower end of the elevator may float in accordance with the material passing over the blade; latch mechanism extending between the elevator and the yoke structure, the mechanism having a lost motion interconnection whereby it is ineffective when the bowl is lower than the position placing the blade substantially at ground level and becomes effective when the blade is substantially at the ground level to thereby resist upward movement of the elevator.

6. The invention defined in claim 5 in which the latch mechanism is adapted for substantial release by a predetermined load being applied whereby contact by the elevator of a large generally unbreakable object will force release of the latch mechanism.

7. The invention defined in claim 5 in which the latch mechanism is composed of a rigid member pivoted for movement to and from a position blocking upward movement of the elevator and a biasing member operatively connected to the rigid member to retain the latter in the blocking position, the biasing member being responsive to upward pressure by the elevator to yield and permit the rigid member to move from the blocking position.

8. The invention defined in claim 5 in which the latch mechanism is composed of a pair of linked members supported on the elevator for vertical movement and interconnected for movement relative to one another but biased to a normal angular relation to one another; means on the yoke structure engaging the linked members for blocking upward movement of the elevator and adapted to change the angular relation contra the biasing force to a second angular relation in response to upward pressure by the elevator, said second angular relation being such as to move the members out of effective blocking range of the engaging means.

9. The invention defined in claim 5 in which the latch mechanism has an overload release latch adapted to resist upward movement of the elevator and is responsive to become engaged only upon the bowl being adjusted vertically to move into a position in which the blade is at the ground level.

References Cited by the Examiner
UNITED STATES PATENTS

| | | | |
|---|---|---|---|
| 2,984,022 | 5/1961 | Johnson | 37—8 |
| 3,210,868 | 10/1965 | Liess | 37—8 |

ABRAHAM G. STONE, *Primary Examiner.*

RAYMOND L. HOLLISTER, *Assistant Examiner.*